United States Patent [19]

Taureg

[11] Patent Number: 5,004,085
[45] Date of Patent: Apr. 2, 1991

[54] FLUID FRICTION COUPLING WITH CLOSING SLIDE

[75] Inventor: Herbert Taureg, Hennef, Fed. Rep. of Germany

[73] Assignee: Viscodrive GmbH, Lohmar, Fed. Rep. of Germany

[21] Appl. No.: 490,146

[22] Filed: Mar. 7, 1990

[30] Foreign Application Priority Data

Mar. 13, 1989 [DE] Fed. Rep. of Germany ....... 3908090

[51] Int. Cl.$^5$ ...................... F16D 31/00; F16D 43/24
[52] U.S. Cl. .............................. 192/58 B; 192/103 F; 192/106 F; 180/248
[58] Field of Search ............... 192/58 B, 58 C, 103 F, 192/104 F, 106 F; 180/248

[56] References Cited

U.S. PATENT DOCUMENTS

| | | | |
|---|---|---|---|
| 3,537,557 | 11/1970 | Olson | 192/106 F |
| 3,677,381 | 7/1972 | Takagi et al. | 192/106 F |
| 4,048,872 | 9/1977 | Webb | 180/248 X |
| 4,261,455 | 4/1981 | Uitenbroek et al. | 192/106 F |

FOREIGN PATENT DOCUMENTS

| | | | |
|---|---|---|---|
| 2439256 | 2/1976 | Fed. Rep. of Germany | 192/58 B |
| 3421797 | 1/1985 | Fed. Rep. of Germany | 192/58 B |
| 184235 | 8/1987 | Japan | 192/58 B |
| 136824 | 5/1989 | Japan | 180/248 |
| 2200434 | 8/1988 | United Kingdom | 192/58 B |

*Primary Examiner*—Allan D. Herrmann
*Assistant Examiner*—Andrea Pitts
*Attorney, Agent, or Firm*—Toren, McGeady & Associates

[57] ABSTRACT

The invention relates to a fluid friction coupling (1) with a housing (2) and a hub (4) rotatably received within the housing. The interior (11) of the housing is divided into a main chamber (22) and a receiving chamber (23). Only the main chamber (22) is occupied by inner plates (8) and outer plates (6) of the coupling. The two chambers (22, 23) are separated by separating plates (18, 19). However, the separating plates (18, 19) comprise closable apertures (24) each of which is associated with a slide (25). The closing slides (25) open the apertures (24), thereby providing a passage between the two chambers (22, 23) when a certain rotational speed is exceeded. As a result, the possibility of a transfer of the coupling (1) into the hump mode is reduced at high rotation speeds.

6 Claims, 3 Drawing Sheets

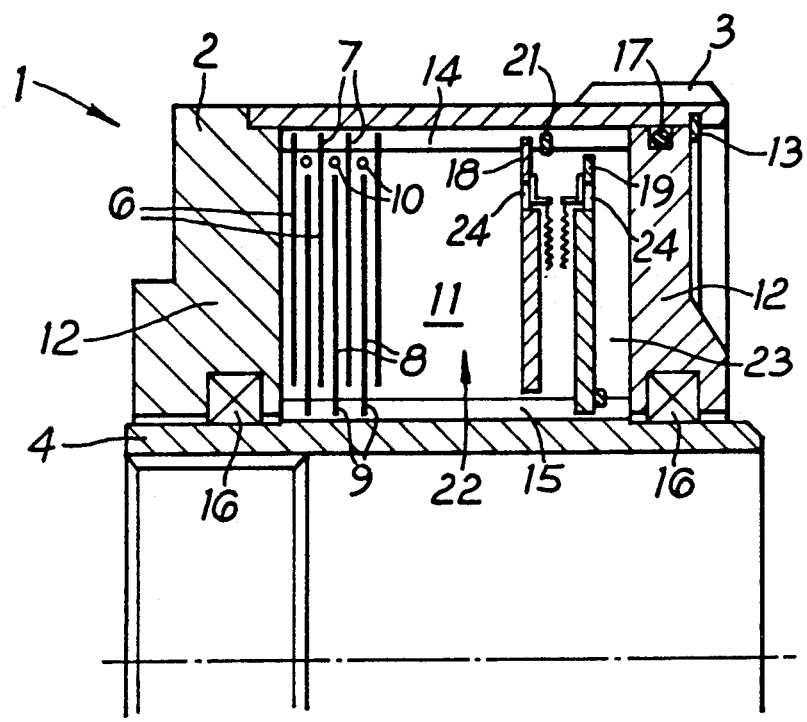
Fig. 1
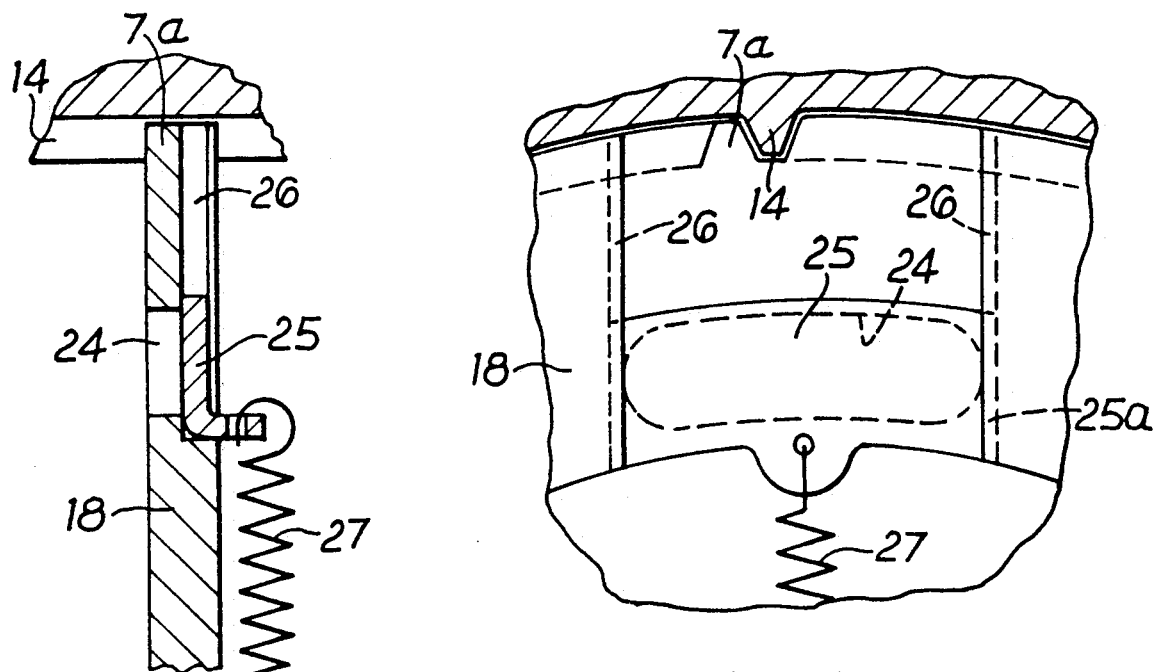
Fig. 2
Fig. 3

FLUID FRICTION COUPLING WITH CLOSING SLIDE

BACKGROUND TO THE INVENTION

1. Field of the Invention

The invention is concerned with a fluid friction coupling comprising a first coupling part in the form of a housing and at least one second coupling part in the form of a hub rotatingly received within the first coupling part, a set of plates associated with each coupling part, each set of plates being non-rotatingly connected to its associated coupling part, the plates associated with the first coupling part being interleaved with those associated with the second coupling part in a main chamber defined in the interior of the first coupling part, and a viscous medium at least partially filling the portion of the interior of the first coupling part which is not occupied by the plates.

2. Description of Prior Art

From GB Patent Specification No. 2 207 492, it is known to provide a drive assembly in a four wheel drive vehicle with a fluid friction coupling which comprises a main chamber in which the plates are arranged and an additional chamber for receiving the viscous fluid. It is the purpose of the coupling to generate different torque characteristics in the two different directions of rotation, with a higher torque building up in the main direction of rotation and with no torque or only a negligible torque being generated in the other direction of rotation.

Fluid friction couplings are preferably used in motor vehicles so that, when different adhesion coefficients occur, there is generated a traction force for the axle not permanently driven or for the other wheel by eliminating the differential function. The fluid friction coupling always builds up a torque if there occurs a speed differential and thus a relative movement between the plates. With low speeds of rotation, i.e. at low speeds or a vehicle speed of 0, a rapid transfer of the coupling into the so-called "hump mode" of the coupling (in which the plates engage one another and 100 per cent torque transmission occurs) is desirable. In other words, the objective is to establish a rigid connection between the driving axle and the vehicle axle driven by it in order to ensure that the vehicle moves. However, at high vehicle speeds, such transmission would have a negative effect on the driving behaviour of the vehicle.

SUMMARY OF THE INVENTION

It is therefore the object of the present invention to design a fluid friction coupling in such a way that at high absolute speeds of the coupling the transition from normal shearing of the viscous fluid into the hump mode is either delayed or even prevented altogether.

The invention provides fluid friction coupling comprising a first coupling part in the form of a housing and at least one second coupling part in the form of a hub rotatingly received within the first coupling part, a set of plates associated with each coupling part, each set of plates being non-rotatingly connected to its associated coupling part, the plates associated with the first coupling part being interleaved with those associated with the second coupling part in a main chamber defined in the interior of the first coupling part, and a viscous medium at least partially filling the portion of the interior of the first coupling part which is not occupied by the plates, wherein the interior of the first coupling part also defines an additional receiving chamber for the viscous medium separated from the main chamber by at least one separating plate associated with one of the coupling parts and provided with at least one aperture which can be opened to allow passage of the viscous medium, the aperture being arranged to be opened when a predetermined rotational speed is exceeded.

In the normal condition, i.e. if the absolute speed is low or 0, the aperture is closed whereas at high absolute speeds it is open, thereby connecting both chambers to allow an exchange of fluid. By providing the housing with separating plates it is ensured that the two chambers are not separated completely, but even with a closed aperture there remains a passage between the two chambers acting as a throttle. This ensures that, in the static condition, the same pressure prevails in both chambers, with the predetermined filling level also being the same in both chambers.

If at low absolute speeds and with a closed aperture, there occurs a greater speed differential between the two coupling parts, the pressure will rapidly increase as a function of the temperature and the energy conversion occurring in the main chamber of the coupling, and the hump effect also desirable for this operating condition and known with fluid friction couplings will take place. However, if at high absolute speeds of the coupling, i.e. at a high speed of both coupling parts, there occurs a greater speed differential, the aperture in the separating plates is open, thereby balancing the internal pressure in the housing interior between the main chamber and the receiving chamber in which no energy conversion and thus no temperature or pressure increase take place. In consequence, depending on the design of the aperture, the occurrence of the hump mode is either delayed or completely prevented.

Although for certain applications only one coupling part needs to be associated with a separating plate, it may be advisable (as proposed in a further embodiment of the invention) to associate each coupling part with a separating plate. One application where each coupling part is associated with a separating plate is the differential lock between two wheels of an axle. In cases where the fluid friction coupling is arranged between two drive axles it is sufficient to provide only one separating plate which, however, should be associated with the output end of the fluid friction coupling.

In a preferred embodiment of the invention there have been provided three circumferentially distributed apertures.

According to a further feature of the invention, each aperture is provided with a slide which is radially movable in guide means of the separating plate and is biased by a spring into a radially inner position in which it closes the aperture. The slide serves as a centrifugal weight which, against the force of the spring, with an increasing speed, is moved from the radially inner position, i.e. the closing position relative to the associated aperture, thereby opening the aperture and establishing the respective connection between the main chamber and the receiving chamber to an increasing extent.

BRIEF DESCRIPTION OF DRAWINGS

Preferred embodiments of the invention are diagrammatically illustrated by way of example in the drawings in which:

FIG. 1 is a longitudinal section through a fluid friction coupling with two sets of plates;

FIG. 2 shows a detail of the coupling of FIG. 1, specifically a separating plate thereof viewed in the longitudinal section of the coupling;

FIG. 3 is a transverse view of the detail of FIG. 2;

DESCRIPTION OF PREFERRED EMBODIMENTS

Figure 4:
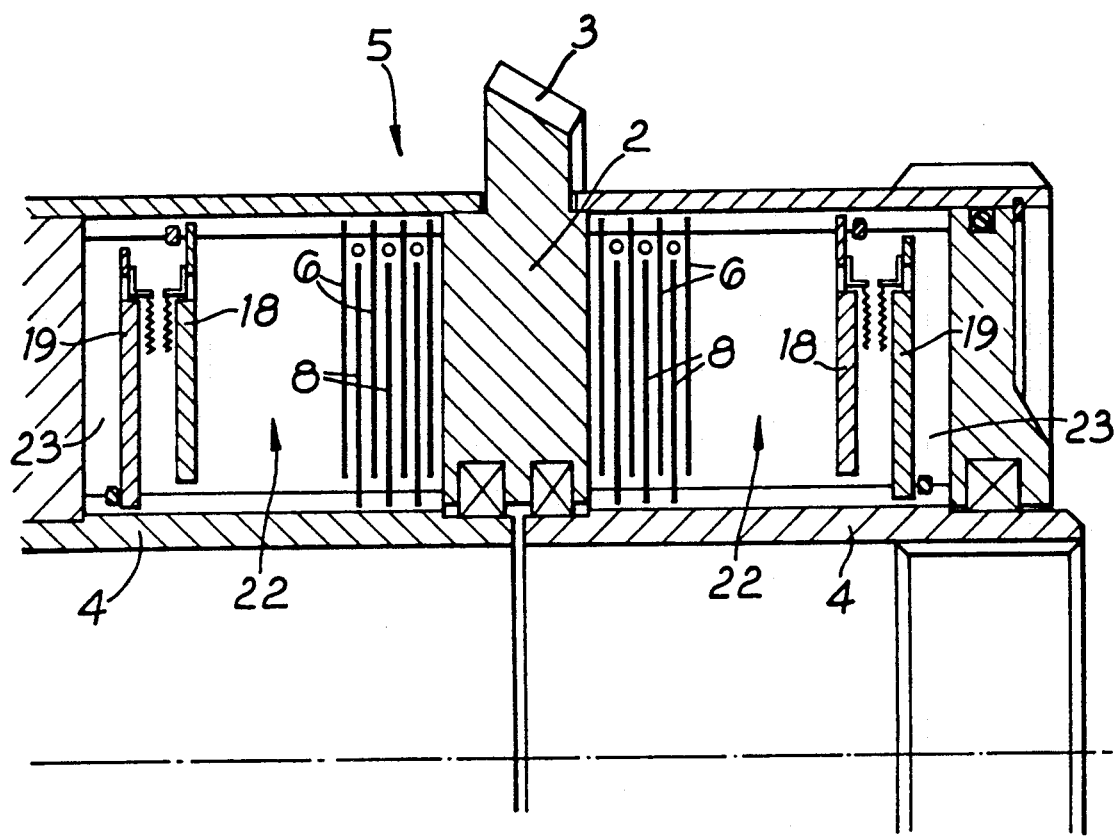
FIG. 4 is a longitudinal section of a second fluid friction coupling which has three sets of plates.

FIG. 1 shows a fluid friction coupling 1 comprising a first coupling part 2 in the form of a housing and a second coupling part 4 in the form of a hub rotatingly received within the first coupling part 2. The housing 2 comprises a cylindrical casing on which outer teeth 3 are provided by means of which the coupling 1 establishes a torque connection with a driving or driven part. The outer teeth 3 may also be designed as a gear for example.

The hub 4 is supported within two covers 12 of the housing 2 so as to be rotatable relative to it. One of the covers 12 is connected by a weld to the housing casing, whereas the other cover 12 is inserted so as to be removable and is held in position by a securing ring 13. Seals 16 have been inserted between the outer face of the hub 4 and the two covers 12. The removable cover 12 is also sealed relative to the housing 2 by a seal 17. The inner casing face of the housing 2 is provided with inner teeth 14. The hub 4 is provided with outer teeth 15. A set of plates is associated with each coupling part 2 and 4, each set of plates being non-rotatingly connected to its associated coupling part. The outer plates 6 associated with the housing 2 are interleaved with the inner plates 8 associated with the hub 4. A viscous medium at least partially fills the portion of the interior of the housing 2 which is not occupied by the plates 6 and 8. The housing interior 11 is divided into two chambers defined by the housing 2, i.e. into a main chamber 22 in which outer plates 6 and inner plates 8 of the coupling are arranged and an additional receiving chamber 23 for the viscous medium which is separated by separating plates 18, 19 from the main chamber 22 and which is not occupied by the plates.

The outer plates 6, on their outer circumference, are provided with teeth 7 which are designed to match the inner teeth 14 of the housing 2 in which they are non-rotatingly received. The inner plates 8, in their central bores, have been provided with inner teeth 9 which are designed to match the outer teeth 15 of the hub 4. The outer plates 6 are spaced by spacer rings 10, whereas the intermediate inner plates 8 are axially movably accommodated in the teeth 15, while being able to approach one of the adjoining outer plates 6. In the present embodiment, there have been provided two separating plates 18, 19, one of which, i.e. the separating plate 18, is associated with the housing 2 and the second one, i.e. the separating plate 19, is associated with the hub 4. The two separating plates 18, 19 have also been provided with outer teeth and inner teeth respectively, and they are non-rotatingly connected to the respective coupling part, i.e. either the housing 2 or the hub 4. Both are axially supported on fixing rings 21. In this way it is ensured that the size of the region of the receiving chamber 23 remains constant. Each separating plate 18 and 19 is provided with at least one aperture 24 which can be opened to allow passage of the viscous medium, the aperture being arranged to be opened when a predetermined rotational speed is exceeded. In this case, the plates 18 and 19 are each provided with three circumferentially distributed apertures 24. Each aperture 24 is provided with a cover or slide 25 which is radially movable to open or close the aperture. Because of the toothed regions with which the separating plates 18, 19 are received in the respective teeth 14, 15 of the housing 2 and the hub 4 there occur gaps between the separating plates 18, 19 and their associated coupling part and also between the two spaced separating plates 18, 19, so that the viscous medium, for example silicone oil, with which the housing interior 11 is at least partially filled may move between the two chambers 22, 23. This is also the case if the apertures 24 provided in the separating plates 18, 19 are covered by the closing slide 25 (see FIG. 2) since the fluid can flow around the edges of the plates 18 and 19.

FIGS. 2 and 3 explain in more detail the design of the apertures 24 and the guidance of the slide 25 in respect of one of the separating plates 18. FIG. 2 shows that the separating plate 18, on its outer circumference, has also been provided with outer teeth 7a which are received in the inner teeth 14 of the housing 2. The apertures 24 are designed as arcuate sections and are approximately kidney-shaped. The separating plates 18, 19 each comprise one closing slide 25 per aperture 24 which are radially movably arranged in guides 26. The guides 26 have been designed as dovetail guides. The side edges 25a of the slides 25 have been designed to match these. The slides 25 are held by tension springs 27 in their radially inner position where they close the respective aperture 24. The springs 27 act between the slides 25 and fixing points (not shown) on the separating plates 18 and 19 and act to bias the slides 25 into their closed position. With an increasing speed, the closing slide 25 is subjected to a centrifugal force which causes the slide 25 to move radially outwardly against the force of the spring 27 and open the respective aperture 24 to a greater or lesser extent, thereby producing a more or less large passage between the main chamber 22 and the receiving chamber 23 so that relative to the main chamber, in the case of shear, a temperature and pressure balance is achieved, thereby preventing the axially movable plates, in the present example the inner plates 8, from being transferred into friction contact with the adjoining outer plates 6. This effect, which would result in 100% of the driving torque being passed on to the output end, is prevented. When the absolute speed is reduced, the closing slide 25, due to the effective force of the spring 27, is returned into the starting position, i.e. the radially inner position, in which it closes the aperture 24.

FIG. 4 shows a so-called torque splitter 5. This is a fluid friction coupling comprising a housing 2, provided with a gear 3, and two hubs 4 supported therein so as to be rotatable independently. The housing 2 is associated with outer plates 6, whereas the two hubs 4 are each associated with a set of inner plates 8. When the housing 2 is driven, for example, the shear effect the viscous medium in the two main chambers 22 formed ensures that a torque is transmitted to the two hubs 4. There have been provided two additional receiving chambers 23 separated by two separating plates 18, 19 from the two main chambers 22. The design of the separating plates 18, 19 is as described in connection with FIG. 2 and 3.

Figure 5:
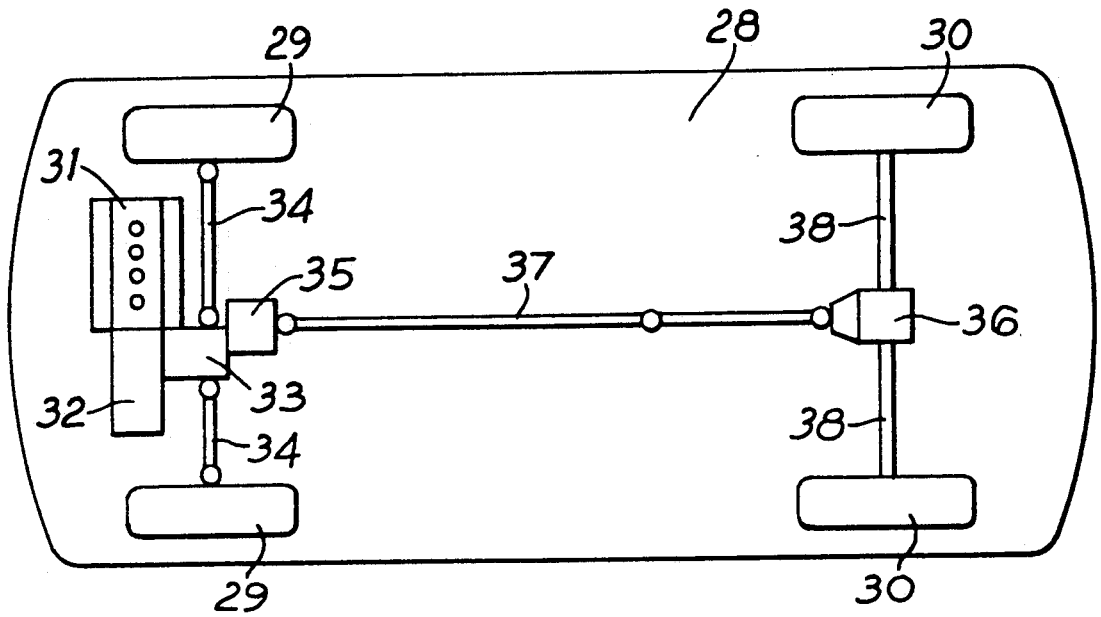
FIG. 5 shows a drive concept for a four wheel drive vehicle provided with a fluid friction coupling in accordance with the invention.
Figure 6:
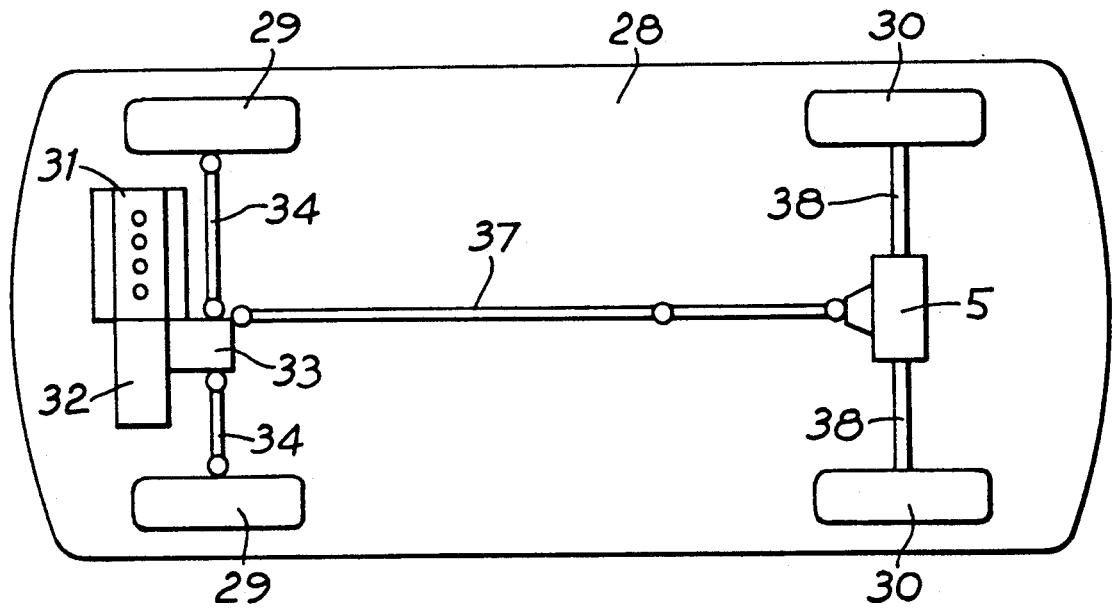
FIG. 6 shows a drive concept with torque splitter.

FIG. 5 illustrates a drive concept for a four wheel drive vehicle 28 whose basic design principle is that of a front wheel driven vehicle. The two front wheels 29 are driven by the engine 31 via the gear box 32 and the front axle differential 33 as well as via the front side shafts 34. The drive for the rear wheels 30 is branched off from the drive of the front axle differential 33. For this purpose, the front axle differential has been associated with a central differential 35 which may be provided with a fluid friction coupling 1 according to FIG. 1 for example, but with only one separating plate, i.e. the separating plate 18, being provided. In such a case, the hub 4 would be the driving part whereas the housing 2 would represent the drive part in driving connection with the rear axle differential 36 by means of a propeller shaft 37 and with the rear wheels 30 by means of rear side shafts 38. The rear axle differential 36 may be provided with a fluid friction coupling according to FIG. 1 with two separating plates 18, 19 by which the open differential designed as a differential bevel gear, for example, is lockable if slip occurs at one of the two rear wheels. Instead of the rear axle differential 36 it is also possible to use a torque splitter 5 in accordance with the fluid friction coupling design as illustrated in FIG. 4. In this case, which is shown in FIG. 6, the central differential 35 is eliminated because a fluid friction coupling designed in this way has the function of a central differential and also that of a lockable rear axle differential.

If in the case of the embodiment including a central differential 35 (FIG. 5), the two positively driven front wheels 29 of the vehicle 28 move on a surface with a lower adhesion co-efficient than the rear wheels 30, the viscous medium is sheared between the outer plates 6 and the inner plates 8 in the fluid friction coupling 1 of the central differential 35 in the main chamber 22, and as a result a torque is transmitted via the propeller shaft 37 and the rear axle differential 36 and the rear side shafts 38 onto the rear wheels 30. However, at a high vehicle speed it could be disadvantageous if the rear wheels, due to a different adhesion co-efficient, were suddenly transferred into the torque transmitting mode because at a high absolute speed there takes place a rapid transfer into the hump mode which may adversely affect the driving stability. For this reason, the coupling is switched off or its torque transmitting ability is reduced to an extent which, depending on design, corresponds to the standard viscous torque or which at least reduces the driving torque passed on.

I claim:

1. A fluid friction coupling, comprising:
    a first coupling part formed as a housing having an interior;
    at least one second coupling part formed as a hub rotatably received within the first coupling part;
    a set of plates associated with each coupling part, each set of plates being non-rotatingly connected to its associated coupling part, the plates associated with the first coupling part being interleaved with those associated with the second coupling part in a main chamber defined in the interior of the first coupling part;
    a viscous medium at least partially filling a portion of the interior of the first coupling part which is not occupied by the plates, the interior of the first coupling part also defining an additional receiving chamber for the viscous medium;
    at least one separating plate associated with one of the coupling parts and provided with at least one aperture so as to separate the receiving chamber from the main chamber;
    a cover for said aperture mounted on said separating plate so as to be movable between a first position in which it closes the aperture and a second position in which the aperture is opened; and
    spring means for biasing the cover to its first position, the cover being arranged to move to its second position under centrifugal force against the action of said spring means when a predetermined rotational speed of the separating plate is exceeded.

2. A fluid friction coupling according to claim 1, wherein there is a separating plate associated with each coupling part.

3. A fluid friction coupling according to claim 1, wherein each separating plate is provided with at least three circumferentially distributed apertures.

4. A fluid friction coupling according to claim 1, wherein each aperture is provided with a slide which is radially movable in guide means of the separating plate and is biased by a spring into a radially inner position in which it closes the aperture.

5. A fluid friction coupling according to claim 4, wherein the spring is arranged to apply a force to the slide such that, at speeds above said predetermined speed, the slide moves radially outwards opening the aperture.

6. A fluid friction coupling according to claim 4, wherein the guide means is in the form of a dovetail guide in the separating plate which matches side edges of the slide.

* * * * *